Oct. 19, 1926.  
F. L. SIMMONS  
1,603,720  
MOUNTING FOR ROTATIVE MAGNETIC CHUCKS  
Filed August 23, 1922   2 Sheets-Sheet 1
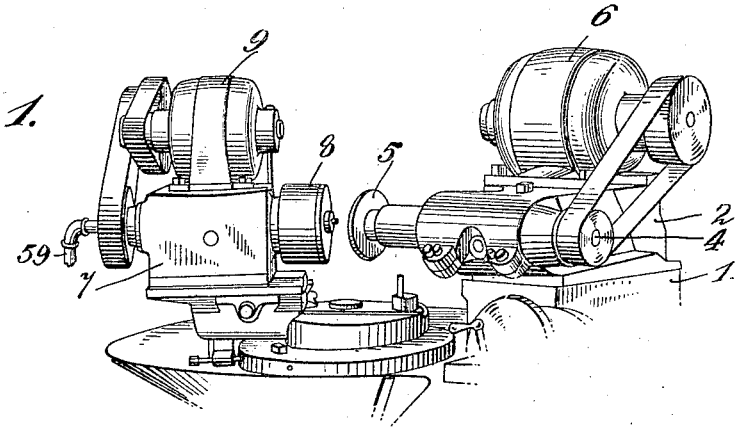
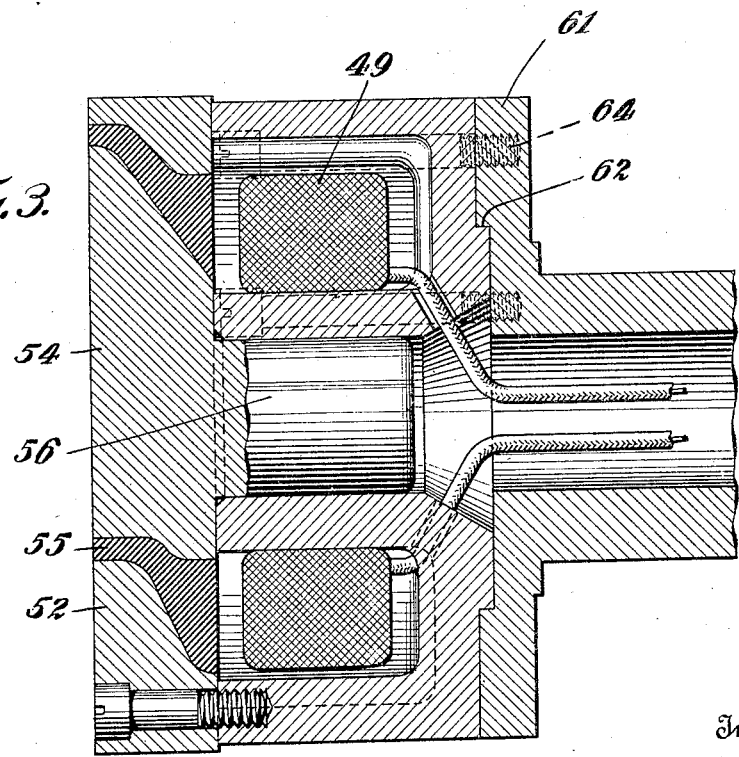
Inventor  
Frank L. Simmons  
By George Ramsey  
his Attorney

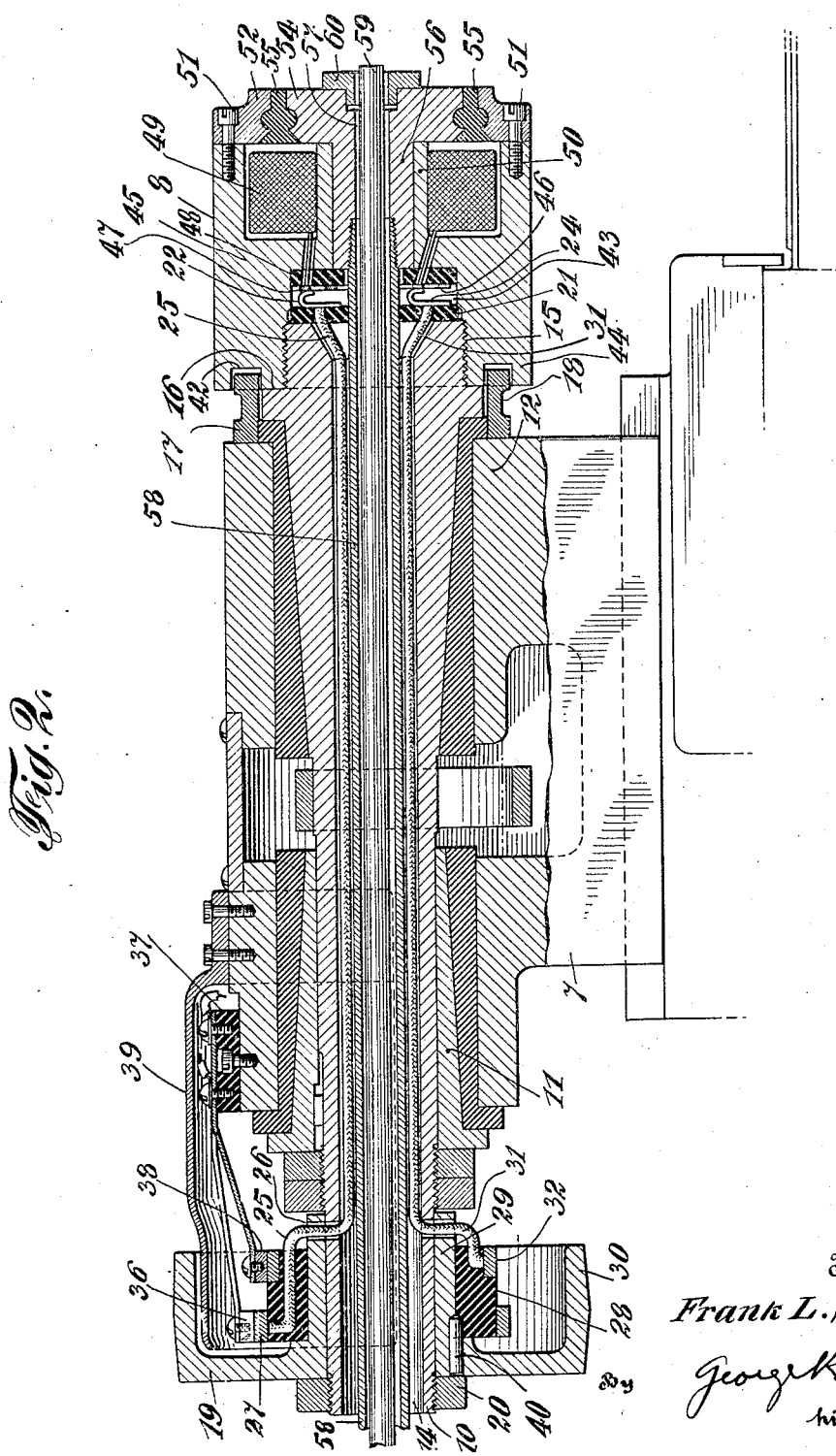

Patented Oct. 19, 1926.

1,603,720

UNITED STATES PATENT OFFICE.

FRANK LEROY SIMMONS, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

MOUNTING FOR ROTATIVE MAGNETIC CHUCKS.

Application filed August 23, 1922. Serial No. 583,713.

The present invention relates to a mounting for magnetic chucks when used to support work being wet ground, and more especially to a mounting for a rotary magnetic chuck wherein the electrical connections are protected from being short circuited by the grinding fluid.

Heretofore in the art it has been customary to provide rotary magnetic chucks with collector rings on the back of the chucks in a relatively exposed position. The depth of the chuck being primarily relied upon to maintain the contact rings a safe distance from the grinding fluid being used on the work supported by the face of the chuck. This type of mounting while fairly satisfactory for large sized chucks presented many difficulties when small rotary chucks were required. The difficulty increased where such small chucks were mounted on relatively rapidly rotating spindles. In the relatively high speed grinding on work held upon small chucks the grinding fluid is more likely to be thrown into contact with the exposed collector rings than where the spindle is slow moving, as in slow speed grinding. If the parts are dry ground then there is a liability of the abrasive particles collecting as dust on the exposed contact rings and rapidly grinding the rings away. In view of these difficulties it is desirable if possible, to lead the electrical current to the chuck from a protected point remote from the grinding wheel. This presents the further problem however of necessitating connections which will permit the changing of magnetic chucks without destruction of the wiring system.

The present invention overcomes the difficulties of the known art by providing wiring connections which extend to the chuck through the spindle of a grinding machine and are connected to collector rings which may be mounted within the flange of the driving pulley of the spindle. These connections lead forwardly from the collector rings on the outer end of the spindle to the head of the spindle and preferably terminate in spring contact plates mounted on a suitable insulating base on the head end of the spindle. The magnetic chuck forming a part of this invention is provided with a relatively deep well formed by a skirt which may be integral with the body portion of the chuck. The base of this well carries contact rings suitably insulated with the body of the chuck. These contact rings form the terminals for energizing coils of the chuck and these rings are so positioned that when the screw threaded portion of the chuck is positioned on the screw threaded head end of the spindle the spring contact plates will engage the contact rings in such manner as to electrically connect one of these rings with one collector ring under the pulley flange and the other contact ring with the remaining collector ring. The center of the chuck may be provided with an axially aligned opening through which a water pipe may extend to lead grinding fluid to the work. A protecting jacket or tube is provided around the water pipe and extends through the spindle where it is screw threaded into the chuck thereby securely protecting the electrical connections against short circuiting by leakage or condensation water that might collect or form around the water tube.

The present invention may also be embodied in a construction comprising a flanged spindle head to which the chuck may be attached by suitable machine screws passing through the chuck body and into the flange head, or vice versa. In such a construction there is no relative movement between the chuck body and the spindle head required when the chuck is mounted upon the head, so therefore, the connecting wires may run directly from the coils in the chuck to the collector rings beneath the flange of the driving pulley, and suitable connections may be made at either end of the wires to permit removal of the chuck without breaking the wires.

Having generally described embodiments of the present invention it may be stated that the objects of the invention are as follows:

The principal object of the present invention is a construction in rotary magnetic chucks whereby the connector wires lead from the chuck through a rotating protective conduit to collector rings spaced apart from the chuck.

Another object of the present invention is a system of electrical transmission wires for rotative magnetic chucks and the like and wherein the collector rings are located remote from the chuck and are located in a recess in a rotating member.

Another object of the present invention is a connector system for rotary magnetic chucks and wherein the electrical wires terminate in spring contact members at the head of the spindle which members are adapted to contact with suitable contact rings carried by the chuck and connected with the coils thereof to permit removal or change of chucks without breakage of wires.

Another and further object of the present invention are connectors for magnetic chuck or the like and wherein the connecting wires lead through a hollow spindle and are connected at one end with contact rings, and at the other end with collector rings.

Another and still further object of the present invention is an electrical system of the character specified wherein a water tube extends through the spindle and with a water jacket protecting the wires from moisture from the water tube and wherein the jacket extends into and is attached to the magnetic chuck.

A still further object of the present invention is a magnetic chuck wiring system for grinders and the like with the chuck on one end of the spindle and collector rings on the other end of the spindle and having suitable leads connecting the chuck and the ring, and wherein a recess is provided in the base of the chuck with the water shed ring extending from the spindle bearing into the recess and having a groove in the water shed ring to lead fluids away from the base of the chuck.

Other and further objects of the present invention will in part be obvious and will in part be pointed out hereinafter in the specification following and defined in the appended claims.

Realizing that the present invention may be embodied in constructions other than those herein specifically disclosed it is desired that the present disclosure shall be understood as illustrative and not in the limiting sense.

In the drawings forming a part of this application like characters are used to represent like parts throughout the several figures.

Figure 1 illustrates the general view of a grinder embodying the present invention.

Figure 2 is a detail view illustrating one embodiment of the present invention and comprises a longitudinal section through a chuck and spindle.

Figure 3 is a detail view of a slightly different embodiment of the present invention and shows a solid chuck and flange head on the spindle shaft.

Referring to the drawings and more specially to Figure 1 which illustrates a portion of the grinder, the bed plate 1 carries a head stock 2 on which is mounted a grinder shaft 4 that carries a grinding wheel 5 and which is driven by a suitable electric motor 6. The bed plate 1 also carries a spindle bearing 7 that carries the spindle shaft on which is mounted a magnetic chuck 8. The spindle shaft is likewise driven by an electric motor 9 through suitable speed reduction members.

Referring now to Figure 2 which is a detail view of the spindle bearing 7 in section, it will be noted that the spindle 10 is provided with conical journals 11 set in bronze bearings 12. The spindle is hollow to comprise an axial opening 14 and is screw threaded at 15 on the forward end. A shoulder or collar 16 is provided adjacent the screw threaded end 15 and forms an abutment member. A protector ring 17 extends over the collar 16 and is formed with a groove 18 comprising a water shed member. The outer end of the spindle carries a driving pulley 19 which is held in place by suitable nut 20 screw threaded on the end of the spindle.

The front or head end of the spindle is provided with a suitable insulating base 21 which carries spring contact plates 22 and 24. It will be noted that the contact portions of these plates are off-set one to the other relatively to the axis of the spindle. An insulated conductor 25 extends through the opening 14 in the spindle to a transverse opening 26 in the side wall of the spindle and is connected with a collector ring 27 that is mounted on an insulating base 28 carried by the hub of the driving pulley 29. It will be noted that the flange 30 of the guiding pulley overhangs and protects this collector ring. The spring contact plate 24 in a similar manner is connected by the insulated conductor 31 with the collector ring 32 which is spaced apart from the collector ring 27 and in a similar manner is also supported by the insulating base 28. A sliding brush 36 carried by insulating block 37 is adapted to engage the collector ring 27 to transmit electricity thereto and in a like arrangement the sliding brush 38 is carried by the insulating block 37 to complete the electrical circuit through the collector ring 32. The brushes are connected to a suitable electrical power line as is well known in the art. A detachable guard 39 extends within the opening under the flange 30 on the driving pulley 19 thereby effectively covering and protecting the contact brushes. A small dowel pin 40 may be driven through an opening in the hub of the driving pulley to prevent the collector rings from slipping on the hub of the driving pulley 19.

A screw threaded portion 15 on the head of the spindle carries a magnetic chuck 8. In the form shown in Figure 2 this chuck is provided with a recess 43 into which the protecting ring 17 extends. The portion of the chuck inside of the ring contacts with the collar 16 to securely hold the chuck in place and maintain the same centered on the spindle. The base of the chuck is provided with a well 43 which is formed by the skirt 44 which extends from the body 45 of the chuck. Contact rings 46 and 47 are mounted in the base of the well 43 upon suitable insulating material 48. These rings form the terminals for the electrical circuit through the coil 49 which is mounted in the body of the chuck on the hollow stem 50 of the body. The face plate of this chuck is separable from the body portion of the chuck and is held in position thereon by machine screws 51. This face plate comprises pole pieces 52 and 54 which are separated by nonmagnetic material 55. The pole piece 54 is provided with a post 56 which extends into the opening in the hollow stem 50 and forms a very rigid construction which automatically centers the face plate in position on the body of the chuck. The face plate post may be provided with an axially aligned opening 57 that has the same axis as the opening 14 in the spindle. A jacket tube 58 extends through the opening 14 in the spindle and is screw threaded by a tapered joint into the post 56 of the chuck thereby forming a water tight joint. This jacket tube rotates with the spindle and the chuck. A stationary water tube 59 extends through the jacket tube 58 and through the opening 57 in the chuck in such manner as to facilitate the supply of grinding fluid to the article being ground and supported on the face of the chuck. Where desired a centering block 60 may be provided in the end of the chuck to enable the operator to quickly and accurately center the work.

Referring now to Figure 3 of the drawings a slightly different form of construction is illustrated. In this embodiment of the invention the spindle head comprises a flange 61 which is set over a shoulder 62 on the base of the chuck and the flange and chuck are held together by suitable fillister head screws 64 which pass through the body of the chuck and into the flange head 61. In this construction rotative movement is not required between the spindle and the chuck when the chuck is attached to the spindle and therefore the leads from the coil 49 may go directly to the collector rings 27 and 32 without the intervention of contact plates and contact rings. In this form shown in Figure 3 the post 56 is shown as being solid and this chuck is particularly adapted for use for dry grinding or where the fluid for wet grinding is supplied adjacent the cutting wheel and not through the spindle of the grinder.

From the foregoing it will appear that the present invention discloses a construction in rotary chucks which facilitates the supply of electrical energy to the chuck without danger of short circuiting the leads by grinding fluids.

The novel features of the magnetic chucks disclosed in this application are not claimed herein but are claimed in my co-pending application.

Having thus described my invention, what I claim is:

1. In combination; a rotatable hollow shaft; an electromagnetic device mounted on one end of said shaft; a plurality of sliding contact devices mounted at the opposite end of said shaft; a fluid conduit extending through said shaft and said electromagnetic device; and circuit connections from said sliding contact devices to said electromagnetic device, said circuit connections comprising conductors passing through said shaft.

2. In combination; a rotatable hollow shaft; a magnetic chuck mounted on one end of said shaft; a plurality of slip rings mounted at the other end of said shaft; an annular protective flange projecting over said slip rings; circuit connections from said slip rings to said magnetic chuck, said connections comprising conductors passing through said hollow shaft; and a fluid conduit passing through said shaft to the face of said chuck.

3. In combination; a hollow shaft; a plurality of slip rings mounted at one end of said shaft; a plurality of electrical contacts mounted at the other end of said shaft; conductors passing through said shaft to connect said slip rings with said contacts; and a magnetic chuck screwed on said shaft, said magnetic chuck being provided with electrical contact rings which engage the contacts mounted at the end of the shaft.

4. In combination; a substantially horizontal rotating shaft, an electromagnetic chuck mounted on said shaft, the base of said chuck being provided with an annular recess; and a stationary protector ring extending into said recess, said ring being provided with an annular groove to carry off liquid falling on said ring.

5. In combination; a rotatable hollow shaft; an electromagnetic device mounted on one end of said shaft; a plurality of sliding contact devices mounted at the opposite end of said shaft; a fluid conduit extending through said shaft and said electromagnetic device; a jacket tube attached to said electromagnetic device and extending through said shaft around said fluid conduit; and circuit connections from said sliding contact devices to said electromagnetic device, said circuit connections comprising conductors passing through said shaft outside of said jacket tube.

6. In combination; a bearing; a hollow shaft passing through said bearing and projecting from both sides thereof, one end of said shaft being threaded to receive a magnetic chuck; electrical connector devices mounted on the threaded end of said shaft; a magnetic chuck screwed on the threaded end of said shaft, said chuck comprising means to automatically make electrical connection with said connector devices when the chuck is screwed on; a fluid conduit extending through said shaft and said magnetic chuck; a jacket tube attached to said chuck and extending through said shaft around said fluid conduit; sliding contact devices on the end of said shaft remote from said chuck; and circuit connections from said sliding contact devices to said electrical connectors, said circuit connections comprising conductors passing through said shaft outside of said jacket tube.

7. In combination; a hollow rotatable shaft; a magnetic chuck mounted on one end of said shaft; a driving pulley mounted on the other end of said shaft remote from said chuck, said pulley comprising an annular overhanging flange extending longitudinally of said shaft; sliding contact devices mounted on said pulley beneath said flange; and conductors passing through said shaft to connect said sliding contact devices with said magnetic chuck.

8. In combination; a hollow rotatable shaft; a magnetic chuck mounted on one end of said shaft; a driving pulley mounted on the other end of said shaft remote from said chuck, said pulley comprising an annular overhanging flange extending longitudinally of said shaft; slip rings mounted on said pulley beneath said flange; brushes contacting with said slip rings; a guard extending between the pulley flange and said brushes; and conductors passing through said shaft to connect said slip rings with said magnetic chuck.

9. In combination: a substantially horizontal bearing; a hollow shaft passing through said bearing and projecting from both sides thereof, one end of said shaft being threaded to receive a magnetic chuck; electrical connector devices mounted on the threaded end of said shaft; a magnetic chuck screwed on the threaded end of said shaft, said chuck comprising means to automatically make electrical connection with said connector devices when the chuck is screwed on; driving means on the end of said shaft remote from said chuck; sliding contact devices also on the end of said shaft remote from said chuck; and circuit connection passing through said shaft from said sliding contact devices to said connector devices.

10. In combination; a substantially horizontal bearing; a hollow shaft passing through said bearing and projecting from both sides thereof, one end of said shaft being adapted to receive a magnetic chuck; electrical connector devices mounted on the chuck end of said shaft; a magnetic chuck secured to the chuck end of said shaft, said chuck comprising means to automatically make electrical connection with said connector devices when the chuck is secured on the shaft; driving means on the end of said shaft remote from said chuck; sliding contact devices also on the end of said shaft remote from said chuck; and circuit connection passing through said shaft from said sliding contact devices to said connector devices.

11. In combination; a bearing; a hollow shaft passing through said bearing and projecting from both sides thereof, one end of said shaft being threaded to receive a magnetic chuck; electrical connector devices mounted on the threaded end of said shaft; a magnetic chuck screwed on the threaded end of said shaft, said chuck comprising means to automatically make electrical connection with said connector devices when the chuck is screwed on; a driving pulley on the end of said shaft remote from said chuck, said pulley comprising an overhanging flange extending longitudinally of said shaft; sliding contact devices mounted on said pulley beneath said flange; and circuit connections passing through said shaft from said sliding contact devices to said connector devices.

12. In a device of the character described, the combination of a shaft provided with a longitudinal passageway, a magnetic chuck having a screw threaded portion, a screw threaded mounting on one end of said shaft and adapted to cooperate with said screw threaded portion on said chuck, sliding contact devices mounted on the opposite end of said shaft, electrical conductors connected with said contact devices and passing through the passageway into said shaft, and contact members on the ends of the conductors adjacent said mounting and adapted to automatically connect said conductors with said magnetic chuck when said chuck is screwed into work position on the end of said shaft.

13. In a device of the class described, the combination of a hollow rotatable shaft, an insulating base on one end of said shaft, contact rings on the other end of said shaft, contact springs mounted upon said base, electrical conductors connecting said rings and springs in such manner that each ring is connected to a contact spring, a driving pulley on said shaft, a magnetic chuck mounted on the end of said shaft carrying the insulating base, and contact means on said chuck to automatically form electrical contact with said springs when the chuck is in operative position on said shaft.

14. In a device of the class described, the combination of a hollow rotatable shaft, a magnetic chuck detachably mounted on one end of said shaft, a driving pulley mounted on the other end of said shaft, electrical sliding contact members on said shaft, and electrical conductors connected to said members and extending through said shaft to electrically connect said detachable chuck to said members, said conductors comprising separable connectors automatically completing the circuit from said chuck to said members when said chuck is placed in operative position on said shaft.

FRANK LEROY SIMMONS.